(12) United States Patent
Shim et al.

(10) Patent No.: US 9,256,832 B2
(45) Date of Patent: *Feb. 9, 2016

(54) INFERENCE PIPELINE SYSTEM AND METHOD

(71) Applicant: Placed, Inc., Seattle, WA (US)

(72) Inventors: David Shim, Seattle, WA (US); Brad Bicknell, Seattle, WA (US); George Varghese, Kirkland, WA (US); Nick Gerner, Seattle, WA (US); Weilie Yi, Bellevue, WA (US)

(73) Assignee: Placed, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,102

(22) Filed: Jun. 9, 2014

(65) Prior Publication Data
US 2014/0304212 A1 Oct. 9, 2014

Related U.S. Application Data

(63) Continuation of application No. 13/405,190, filed on Feb. 24, 2012, now Pat. No. 8,768,876.

(51) Int. Cl.
*G06F 15/18* (2006.01)
*G06N 5/04* (2006.01)

(52) U.S. Cl.
CPC . *G06N 5/048* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 6,449,485 B1 | 9/2002 | Anzil | |
| 7,349,768 B2 | 3/2008 | Bruce et al. | |
| 7,454,442 B2 | 11/2008 | Cobleigh et al. | |
| 7,650,231 B2 | 1/2010 | Gadler | |
| 7,966,658 B2 | 6/2011 | Singh et al. | |
| 8,010,685 B2 * | 8/2011 | Singh | H04L 63/0245 709/229 |
| 8,090,351 B2 | 1/2012 | Klein | |
| 8,200,247 B1 | 6/2012 | Starenky et al. | |
| 8,220,034 B2 | 7/2012 | Hahn et al. | |
| 8,229,458 B2 | 7/2012 | Busch | |
| 8,296,842 B2 * | 10/2012 | Singh | G06F 21/55 713/153 |
| 8,509,761 B2 | 8/2013 | Krinsky et al. | |
| 8,588,942 B2 | 11/2013 | Agrawal | |
| 8,594,680 B2 | 11/2013 | Ledlie et al. | |
| 8,613,088 B2 * | 12/2013 | Varghese | H04L 63/1408 709/223 |
| 8,613,089 B1 | 12/2013 | Holloway et al. | |
| 8,768,876 B2 * | 7/2014 | Shim | G06N 5/048 706/52 |
| 8,942,953 B2 | 1/2015 | Yuen et al. | |
| 8,972,357 B2 * | 3/2015 | Shim | G06F 17/30241 455/456.3 |
| 2007/0244633 A1 | 10/2007 | Phillips et al. | |

(Continued)

OTHER PUBLICATIONS

GeoEcho: Inferring User Interests from Geotag Reports in Network Traffic, Ning Xia; Miskovic, S.; Baldi, M.; Kuzmanovic, A.; Nucci, A. Web Intelligence (WI) and Intelligent Agent Technologies (IAT), 2014 IEEE/WIC/ACM International Joint Conferences vol. 2 pp. 1-8, DOI: 10.1109/WI-IAT.2014.73 Referenced in: IEEE Conference Publications.*

(Continued)

*Primary Examiner* — Michael B Holmes
(74) *Attorney, Agent, or Firm* — Perkins Coie LLP

(57) ABSTRACT

A system to infer place data is disclosed that receives location data collected on a user's mobile electronic device, recognizes when, where and for how long the user makes stops, generates possible places visited, and predicts the likelihood of a user to visit those places.

24 Claims, 8 Drawing Sheets

(56) References Cited

U.S. PATENT DOCUMENTS

| | | |
|---|---|---|
| 2009/0089558 A1 | 4/2009 | Bradford et al. |
| 2009/0204354 A1 | 8/2009 | Davis et al. |
| 2009/0276235 A1 | 11/2009 | Benezra et al. |
| 2009/0278738 A1 | 11/2009 | Gopinath |
| 2010/0041378 A1 | 2/2010 | Aceves et al. |
| 2010/0161720 A1 | 6/2010 | Colligan et al. |
| 2010/0211425 A1 | 8/2010 | Govindarajan |
| 2010/0223346 A1 | 9/2010 | Dragt |
| 2010/0257036 A1 | 10/2010 | Khojastepour et al. |
| 2011/0076653 A1 | 3/2011 | Culligan et al. |
| 2011/0099046 A1 | 4/2011 | Weiss et al. |
| 2011/0099047 A1 | 4/2011 | Weiss et al. |
| 2011/0099048 A1 | 4/2011 | Weiss et al. |
| 2011/0215903 A1 | 9/2011 | Yang et al. |
| 2012/0246004 A1 | 9/2012 | Book et al. |
| 2012/0264446 A1 | 10/2012 | Xie et al. |
| 2013/0225202 A1 | 8/2013 | Shim et al. |
| 2013/0226857 A1 | 8/2013 | Shim et al. |
| 2013/0254227 A1 | 9/2013 | Shim et al. |

OTHER PUBLICATIONS

Using RFID Technology and SOA with 4D Escape Route Hsu-Yang Kung; Che-I Wu; Chi-Hua Chen; Yuan-Hung Lan Wireless Communications, Networking and Mobile Computing, 2008. WiCOM '08. 4th International Conference on Year: 2008 pp. 1-4, DOI: 10.1109/WiCom.2008.3030 Referenced in: IEEE Conference Publications.*

Verification of AIRS boresight accuracy using coastline detection Gregorich, D.T.; Aumann, H.H. Geoscience and Remote Sensing, IEEE Transactions on Year: 2003, vol. 41, Issue: 2 pp. 298-302, DOI: 10.1109/TGRS.2002.808311 Referenced in: IEEE Journals & Magazines.*

* cited by examiner

INFERENCE PIPELINE SYSTEM AND METHOD

CROSS-REFERENCE TO RELATED APPLICATION

This application is a continuation of U.S. application Ser. No. 13/405,190, filed Feb. 24, 2014, entitled "INFERENCE PIPELINE SYSTEM AND METHOD" (U.S. Pat. No. 8,768,876), This application is related to U.S. application Ser. No. 13/405,182 filed Feb. 24, 2012 and U.S. application Ser. No. 13/892,201 filed May 10, 2013 both entitled "SYSTEM AND METHOD FOR DATA COLLECTION TO VALIDATE LOCATION DATA" All applications listed above are hereby incorporated by reference in their entireties.

BACKGROUND

There are a variety of existing technologies which track and monitor location data. One example is a Global Positioning Satellite (GPS) system which captures location information at regular intervals from earth-orbiting satellites. Another example is a radio frequency identification (RFID) system which identifies and tracks the location of assets and inventory by affixing a small microchip or tag to an object or person being tracked. Tracking of individuals, devices and goods may be performed using WiFi (IEEE 802.11), cellular wireless (2G, 3G, 4G, etc.) and other WLAN, WAN and other wireless communications technologies.

Additional technologies exist which use geographical positioning to provide information or entertainment services based on a user's location. In one example, an individual uses a mobile device to identify the nearest ATM or restaurant based on his or her current location. Another example is the delivery of targeted advertising or promotions to individuals whom are near a particular eating or retail establishment.

In existing systems, received information, such as both user data and place data are noisy. User location data can be noisy due to poor GPS reception, poor Wi-Fi reception, or weak cell phone signals. Similarly, mobile electronic devices can lack certain types of sensors or have low quality sensor readings. In the same way, the absence of a comprehensive database of places with sufficient coverage and accurate location information causes place data to also be noisy.

The need exists for a method that utilizes location data to accurately identify the location of people, objects, goods, etc., as well as provide additional benefits. Overall, the examples herein of some prior or related systems and their associated limitations are intended to be illustrative and not exclusive. Other limitations of existing or prior systems will be become apparent to those skilled in the art upon reading the following Detailed Description.

BRIEF DESCRIPTION OF THE DRAWINGS

The details of one or more implementations are set forth in the accompanying drawings and the description below. Further features of the invention, its nature and various advantages, will be apparent from the following detailed description and drawings, and from the claims.

Examples of a system and method for a data collection system are illustrated in the figures. The examples and figures are illustrative rather than limiting.

DETAILED DESCRIPTION

Figure 1:
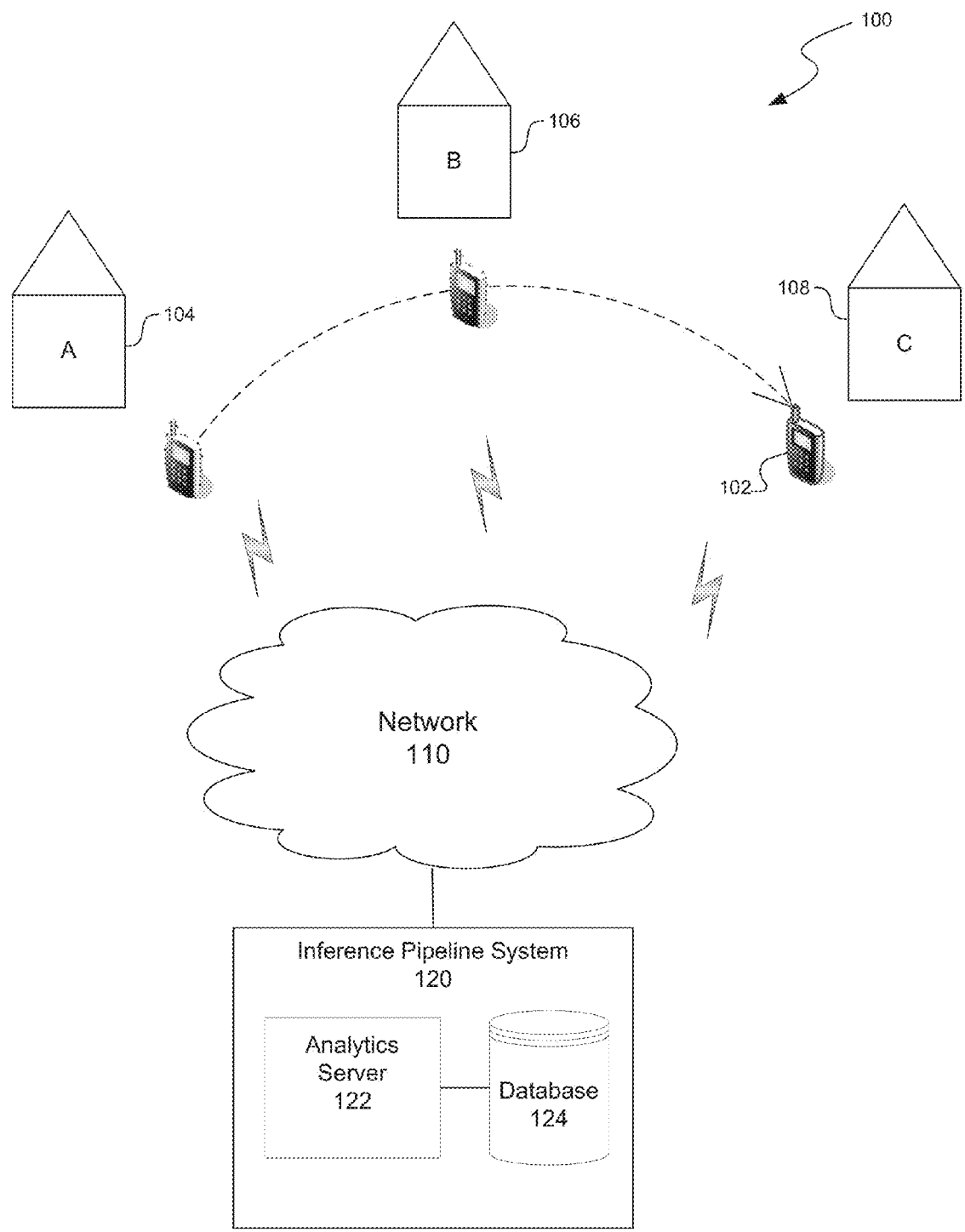
FIG. 1 depicts an example of an inference pipeline system and an environment in which one embodiment of the inference pipeline system can operate.

An inference pipeline system and method which incorporates validated location data into inference models is described herein. Given a user's information collected from a mobile electronic device, the inference pipeline recognizes whether a user visited a place, and if so, the probability of the user at a place, and how much time the user spent at the place. It also produces user location profiles, which include information about familiar routes and places.

In some cases, the inference pipeline systems and methods are part of a larger platform for identifying and monitoring a user's location. For example, the inference pipeline system can be coupled to a data collection system which collects and validates location data from a mobile device. Collected user information includes location data such as latitude, longitude, or altitude determinations, sensor data from, for example, compass/bearing data, accelerometer or gyroscope measurements, and other information that can be used to help identify a user's location and activity. Additional details of the data collection system can be found in U.S. patent application Ser. No. 13/405,182.

A place includes any physical establishment such as a restaurant, a park, a grocery store, or a gas station. Places can share the same name. For example, a Starbucks café in one block and a Starbucks café in a different block are separate places. Places can also share the same address. For example, a book store and the coffee shop inside are separate places. Each place can have attributes which include street address, category, hours of operation, customer reviews, popularity, and other information.

In one embodiment, the inference pipeline recognizes when a user visits a place based on location and sensor data. As an example, the inference pipeline system recognizes when a user makes a stop. Next, the place where the user has stopped can be predicted by searching various data sources, combining signals such as place attributes, collecting data from a mobile electronic device, harvesting user demographic and user profile information, monitoring external factors such as season, weather, and events, and using an inference model to generate the probabilities of a user visiting a place.

In another embodiment, the inference pipeline combines various signals to rank all the possible places a user could be visiting. In another embodiment, the inference pipeline estimates the probability of a user visiting a place and the time user has spent at a place.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment 100 in which an inference pipeline system 120 can operate. A user device 102 is shown which moves from one location to another. As an example, user device 102 moves from a location A 104 to location B 106 to location C 108. The user device 102 may be any suitable device for sending and receiving communications and may represent various electronic systems, such as personal computers, laptop computers, tablet computers, mobile phones, mobile gaming devices, or the like. Those skilled in the relevant art will appreciate that aspects of the invention can be practiced with other communications, data processing, or computer system configurations, including: Internet appliances, hand-held devices [including personal digital assistants (PDAs)], wearable computers, all manner of cellular or mobile phones [including Voice over IP (VoIP) phones], dumb terminals, media players, gaming devices, multi-processor systems, microprocessor-based or programmable consumer electronics, and the like.

As the user device 102 changes locations, the inference pipeline system 120 receives location information through a communication network 110. Network 110 is capable of providing wireless communications using any suitable short-range or long-range communications protocol (e.g., a wireless communications infrastructure including communications towers and telecommunications servers). In other embodiments, network 110 may support Wi-Fi (e.g., 802.11 protocol), Bluetooth, high-frequency systems (e.g., 2G/3G/4G, 900 MHz, 2.4 GHz, and 5.6 GHz communication systems), infrared, or other relatively localized wireless communication protocol, or any combination thereof. As such, any suitable circuitry, device, and/or system operative to create a communications network may be used to create network 110. In some embodiments, network 110 supports protocols used by wireless and cellular phones. Such protocols may include, for example, GSM, GSM plus EDGE, CDMA, quad-band, and other cellular protocols. Network 110 also supports long range communication protocols (e.g., Wi-Fi) and protocols for placing and receiving calls using VoIP or LAN.

As will be described in additional detail herein, the inference pipeline system 120 comprises of an analytics server 122 coupled to a database 124. Indeed, the terms "system," "platform," "server," "host," "infrastructure," and the like are generally used interchangeably herein, and may refer to any computing device or system or any data processor.

1. Input/output

This section describes inputs and outputs of the inference pipeline.

1.1 Input

The input to the inference pipeline is a sequence of location and/or sensor readings that have been logged by the mobile electronic device. For example, the data may come from GPS, Wi-Fi networks, cell phone triangulation, sensor networks, other indoor or outdoor positioning technologies, sensors in the device itself or embedded in a user's body or belongings, and geo-tagged contents such as photos and text.

For example, for location data from GPS, each location reading includes a time stamp, location source, latitude, longitude, altitude, accuracy estimation, bearing and speed. Each sensor reading includes a time stamp, type of sensor, and values.

The frequency of location and sensor readings depends on how the user is tracked (e.g., continuously-tracked, session-based).

1.2 User Data Acquisition

Data may be acquired from the user through various methods. In one embodiment, there are two user data acquisition methods. The first is by continuously tracking users whom have a tracking application installed and running at all times. For these users, locations are logged with a low frequency to conserve battery life, such as once per minute.

The second method is session-based whereby users are indirectly tracked through third-parties. When to start and end tracking is controlled by the third-party application or device. When a tracking session begins, a user location is logged with a high frequency, to compensate for potentially short usage time. As an example, table 1 provides example input data to the inference pipeline, such as location readings.

Table 1 shows accuracy values which are sometimes available from location providers. For example, a device with the Android operating system produces accuracy estimations in meters for GPS, WiFi, and cell-tower triangulated locations. For GPS, accuracy estimations can be within 50 meters while cell-phone tower triangulations have accuracy estimations within 1500 meters. In the example shown in Table 1, the higher the accuracy value, the less accurate the reading.

TABLE 1

| Time | Latitude | Longitude | Altitude | Accuracy |
| --- | --- | --- | --- | --- |
| Fri, 22 Jul 2011 01:39:18 GMT | −28.167926 | 153.528904 | 48.599998 | 19 |
| Fri, 22 Jul 2011 01:39:19 GMT | −28.167920 | 153.528890 | 45.700001 | 17 |
| Fri, 22 Jul 2011 01:39:20 GMT | −28.167922 | 153.528866 | 47.700001 | 15 |

1.3 Output

The output of the inference pipeline is a list of places that the user is predicted to have visited. Each predicted place includes place name, place address, start time of the visit and end time of the visit. The inference pipeline system includes maintaining a place database as will be discussed herein. Thus, each prediction also has an identifier to the place entry in the database so that other information about the place is accessible. As an example, Table 2 provides example output data from the inference pipeline, such as place predictions.

TABLE 2

| From | To | Place |
| --- | --- | --- |
| Mon, 07 Nov 2011 19:18:32 GMT | Mon, 07 Nov 2011 20:02:21 GMT | Valley Curls |
| Mon, 07 Nov 2011 20:17:24 GMT | Mon, 07 Nov 2011 20:24:11 GMT | Mesquite City Hall |

2. Workflow

Figure 2:
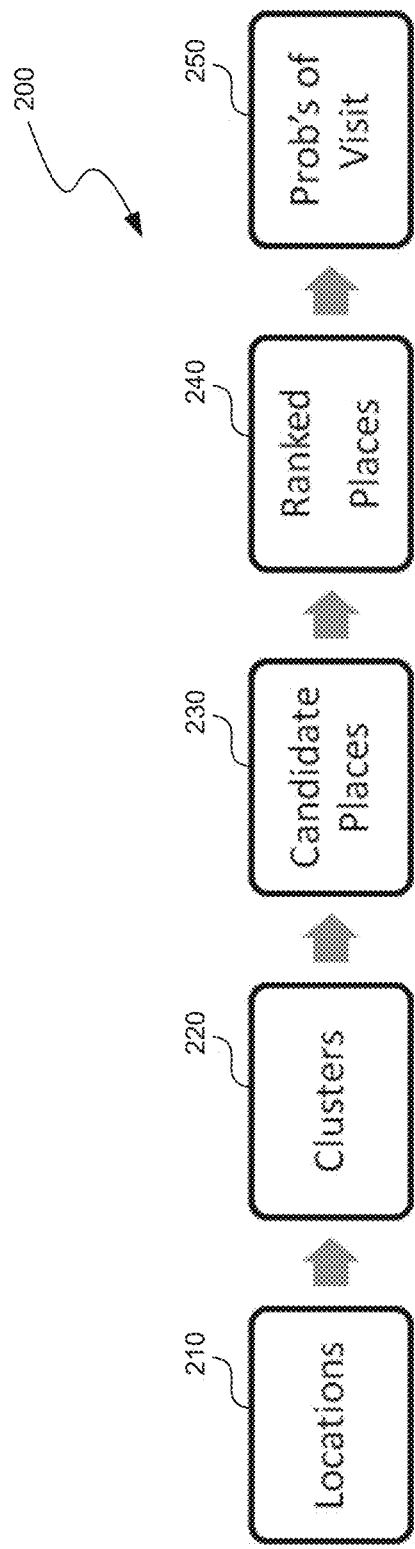
FIG. 2 depicts a high-level view of the workflow of the inference pipeline.

FIG. 2 is a high-level view 200 of the workflow of the inference pipeline. The pipeline takes raw location and sensor readings as input and generates probabilities that a user has visited a place.

For each data acquisition mode (i.e., continuously-tracked, and session-based), different techniques are used to predict the location of the user. This section focuses on the first type, continuously tracked users. The other type, session users, will be discussed later.

First the location readings, ordered by time stamp, are passed to a temporal clustering algorithm that produces a list of location clusters. Each cluster consists of a number of location readings that are chronologically continuous and geographically close to each other. The existence of a cluster indicates that the user was relatively stationary during a certain period of time. For example, if a user stopped by a Shell gas station from 8:30 AM to 8:40 AM, drove to a Starbucks coffee at 9:00 AM, and left the coffee shop at 9:20 AM, ideally two clusters should be generated from the location readings in this time period. The first cluster is made up of a number of location readings between 8:30 AM and 8:40 AM, and those locations should be very close to the actual location of the gas station. The second cluster is made up of a number of location readings between 9:00 AM and 9:20 AM, and those locations should be very close to the coffee shop. Any location readings between 8:40 AM and 9:00 AM are not used for inference. Each cluster has a centroid that the system computes by combining the locations of this cluster. A cluster can be further segmented into a number of sub-clusters, each with a centroid that is called a sub-centroid.

After a cluster is identified from a user's location readings, the place database is queried for places nearby the cluster's centroid. This search uses a large radius in hope to mitigate the noise in location data and cover all the candidate places the user may be located. A feature generation process examines each candidate place and extracts features that characterize the place. The inference model takes the features of each candidate place and generates the probabilities of each candidate being the correct place.

To tune this inference model, a "ground truth," or process to confirm or more accurately determine place location, is created that includes multiple mappings from location readings to places. A machine learning module uses this ground truth as training and testing data set to fine tune the model.

3. Process

Figure 3:
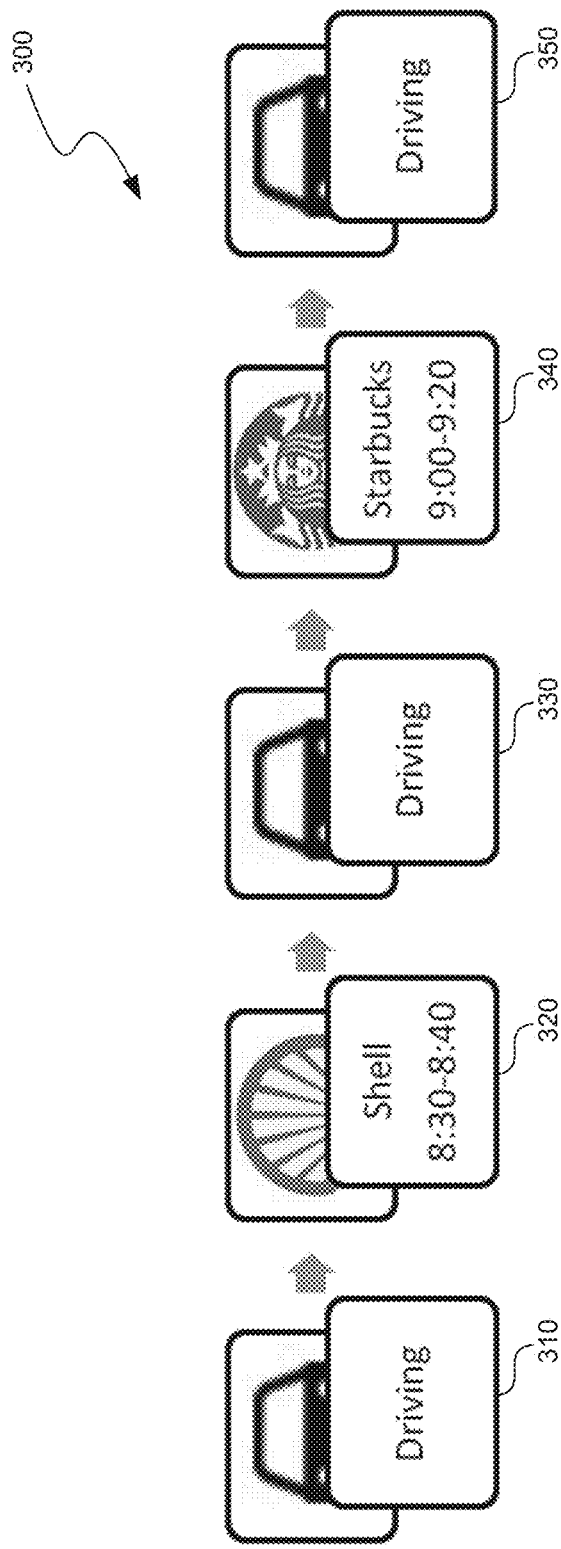
FIG. 3 illustrates an example path of a user and the subsequent data that can be derived and analyzed by the inference pipeline system.
Figure 4:
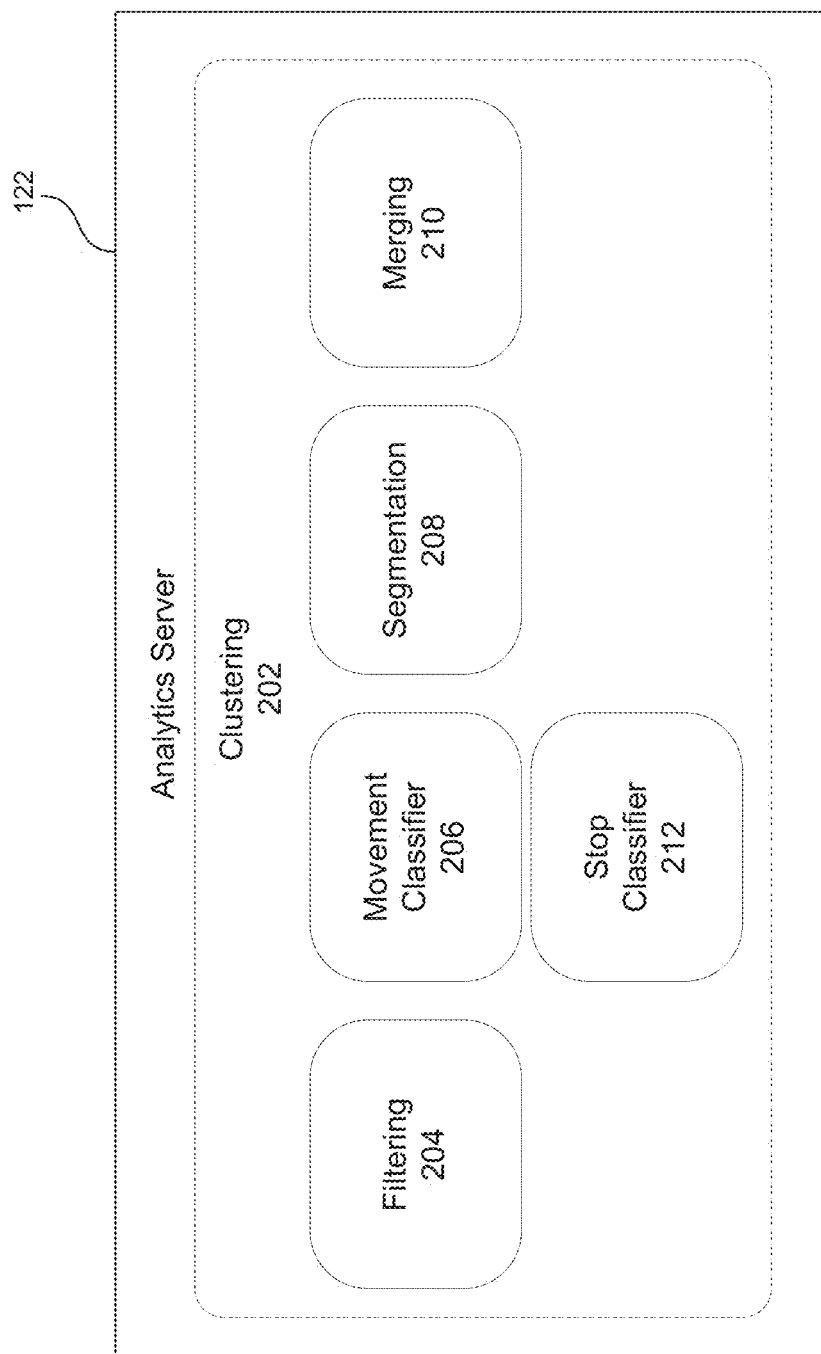
FIG. 4 depicts a block diagram of example components in an embodiment of the analytics server of the inference pipeline system.

FIG. 4 depicts a block diagram of example components or modules in an embodiment of the analytics server 122 of the inference pipeline. As shown in FIG. 4, the analytics server 122 of the inference pipeline can include, but is not limited to, a clustering and analysis component 202, a filtering component, 204, a movement classifier component 206, segmentation component 208, a merging component 210, and a stop classifier component 212. (Use of the term "system" herein may refer to some or all of the elements of FIG. 3, or other aspects of the inference pipeline system 120.) The following describes details of each individual component.

The functional units described in this specification may be called components or modules, in order to more particularly emphasize their implementation independence. The components/modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

3.1 Clustering

The clustering and analysis module 202 takes raw location data and sensor data as input and detects when a user has visited a place, and how a user transitions from one place to another place. The clustering module may include three basic processes. First, raw location data pass through a filter to remove spiky location readings. Second, the stop and movement classifier identify user movement, and segmentation splits the location sequence into segments during which the user is believed to be stationary or stopped. Third, neighboring segments that are at the same location are merged to further reduce the effect of location noise.

3.1.1 Filtering

The filtering component 204 may filter two types of location readings: location readings with low accuracies and noisy location readings.

The first type, location readings with low accuracies, can include location data from cell tower triangulation, which may be filtered out. Any other location data with estimated accuracy worse than a threshold can be filtered out too. This accuracy estimation is reported by the mobile electronic device. As described above, accuracy estimations are measured in meters and a reasonable threshold would be 50 meters.

The second type, noisy location readings, can be locations without explicitly low accuracy estimations, but have specific attributes (e.g., unreliable, erratic, etc.). To capture spiky locations, a window size may be used to measure the deviation of a location reading. A predetermined number of location readings immediately preceding the location in question, and a predetermined number of location readings immediately after, are used to compute the average location of a neighborhood (e.g., two readings before and after). If the distance between location in question and the neighborhood average is greater than a threshold, the location in question is removed. In this case, the threshold can be different from the threshold for accuracy estimations and is used to prevent spiky location readings that are reported to be highly accurate. As an example, a WiFi location may have a high accuracy value (e.g., low number in meters), but in fact be pinpointing a place in a different country.

Figure 5A:
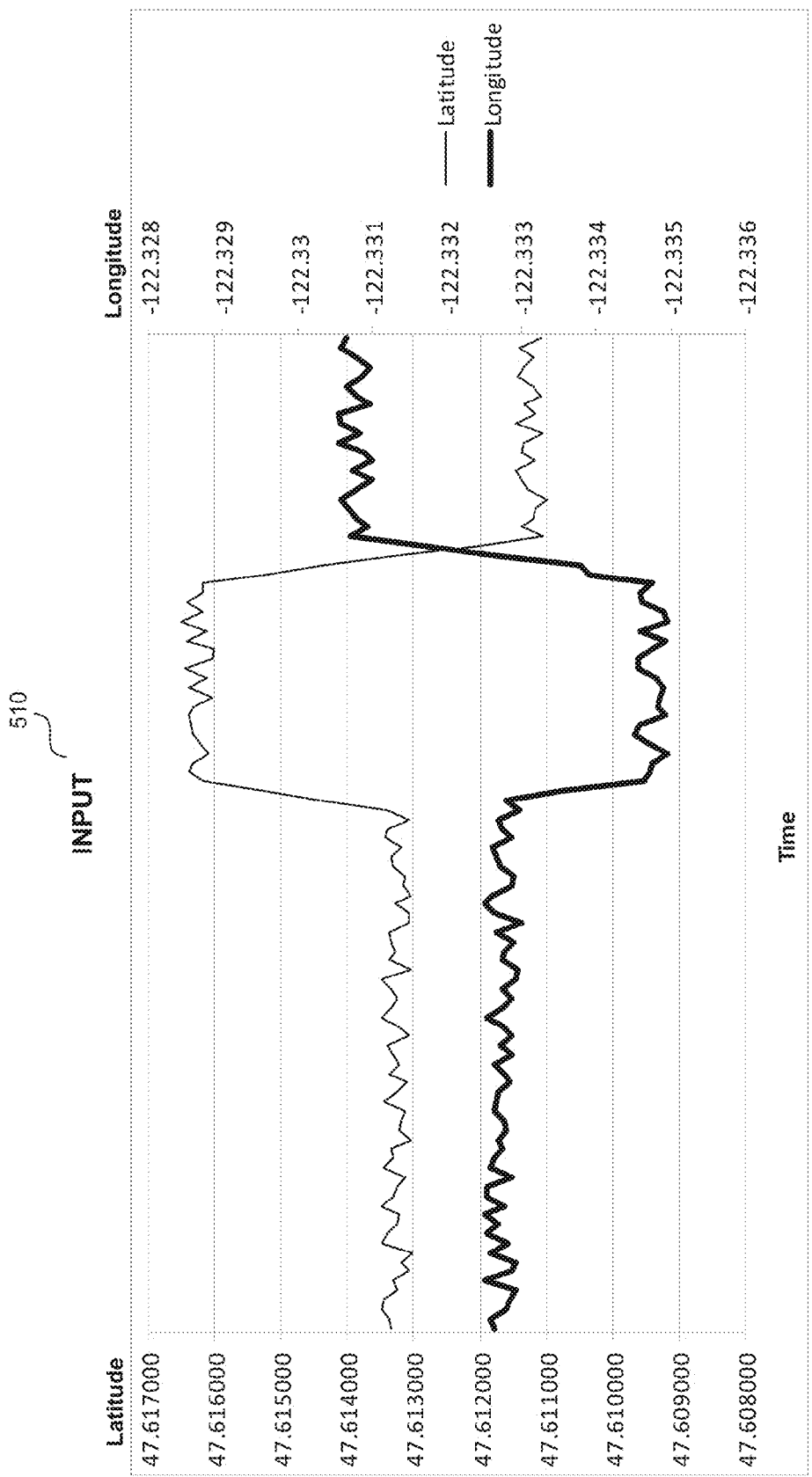
FIGS. 5A and 5B depict example inputs and outputs to a clustering algorithm.
Figure 5B:
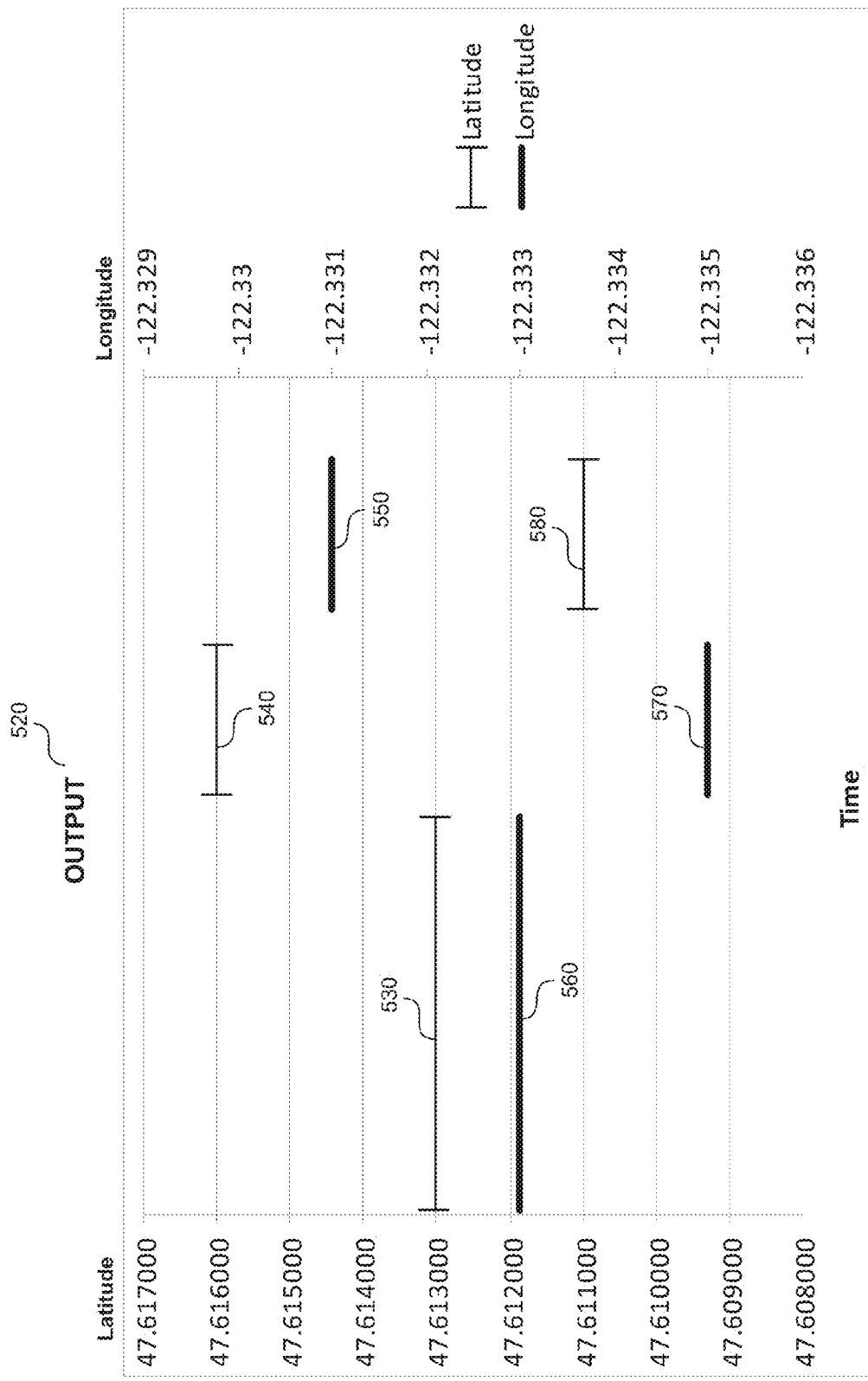

FIGS. 5A and 5B illustrate example inputs and outputs of a clustering 202 module or process. FIG. 5A shows the various location readings while FIG. 5B shows the final results of the clustering module 202. X-axis is time, while y-axes are latitude and longitude. The input is a sequence of location readings that can be very noisy. After running the clustering module, three clusters are identified from the straight lines shown in FIG. 5B, with centroids at coordinates <47.613, −122.333>, <47.616, −122.355>, and <47.611, −122.331> respectively. Although FIGS. 5A and 5B only show latitude and longitude, altitude and sensor data may also be taken into account in the clustering module.

3.1.2 Movement Classifier

The movement classifier component 206 can detect movement in at least two ways under the clustering module 202.

3.1.2.1 Location Trace Based

Under location trace based methods, the movement classifier component 206 uses a sliding time window that moves along a location sequence. For each window, the movement classifier component determines whether the user moved during this period. If the movement classifier component determines that the user has likely moved, the classifier splits the location sequence at the point in the window where the user speed is greatest.

Figure 6:
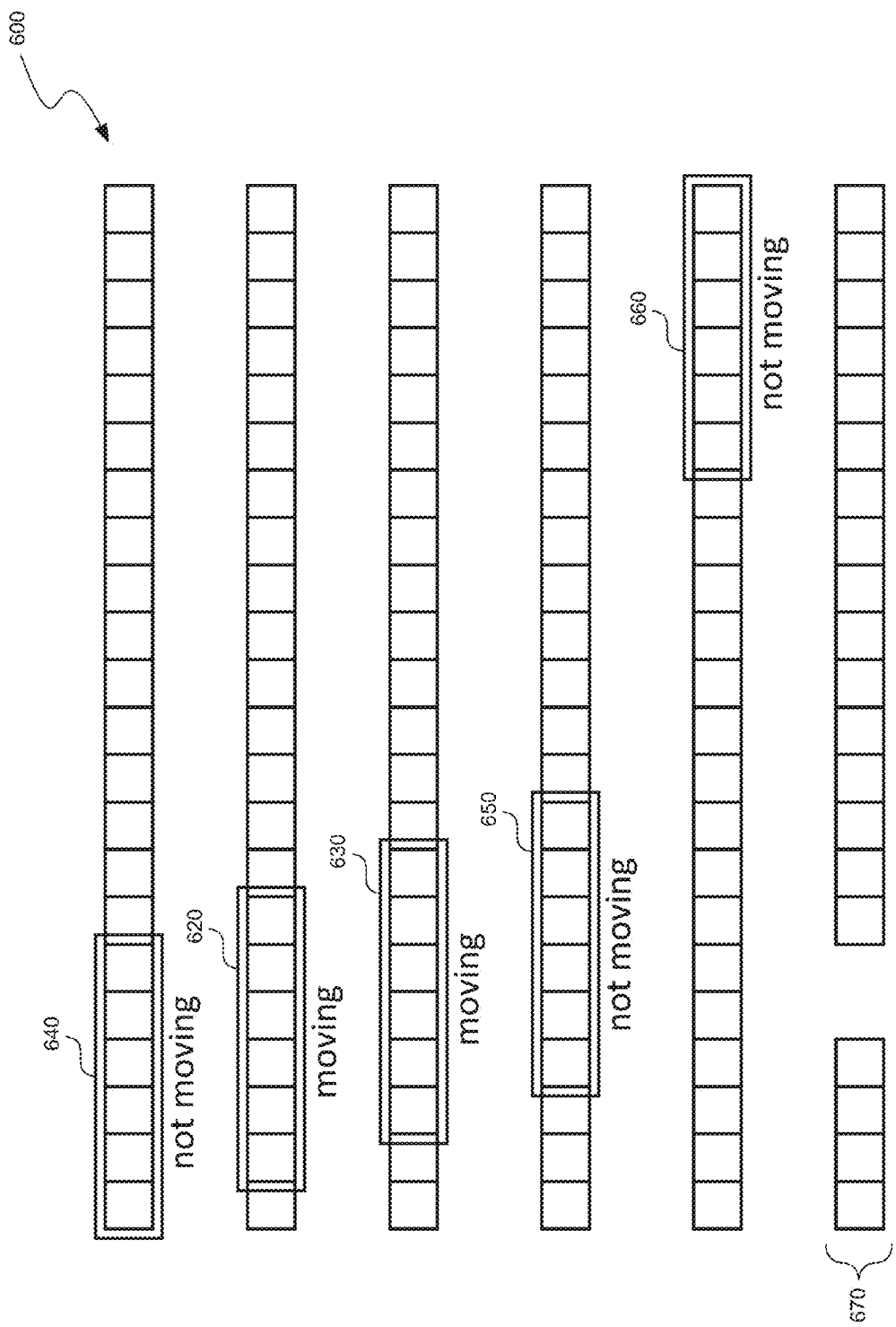
FIG. 6 depicts a location trace based method of detecting movement.

FIG. 6 illustrates this location trace based method 600 of detecting movement. As illustrated in FIG. 6, each block in the five rows represents a location reading. The second and third windows 620 and 630 are classified as moving and the other windows 640, 650, 660 are classified as not moving. As the result, the location sequence is broken into two segments as shown by the row 670.

The sliding window in the example of FIG. 6 has a size of six readings. The movement classifier uses this window of six readings to determine if the user was moving. First the diameter of the bounding box of this window is computed using the minimum and maximum of latitude and longitude.

$$\text{diameter} = D(<\text{latitude}_{min}, \text{longitude}_{min}>, <\text{latitude}_{max}, \text{longitude}_{max}>)$$

where D is the great-circle distance between two locations on Earth.

Additionally, the speed of this window, defined below, is also computed $$\text{speed} = \frac{\text{diameter}}{\text{duration}}$$

where duration is the length of the sliding window.

If the diameter is greater than a threshold, such as 100 meters, or if the speed is greater than a threshold (such as one meter per second), the classifier outputs true (moving); otherwise it outputs false (not moving).

3.1.2.2 Sensor Based Method

The other method uses sensors in the tracking device to detect if a user is moving. When accelerometer data is available, the movement classifier uses a similar sliding window and applies a Fourier transform to the sensor data (e.g., accelerometer data) to calculate the base frequency of user movement in each time window. Depending on this frequency, a user's movement is classified as moving or stationary.

3.1.3 Splitting Location Sequence

If the movement classifier classifies a window as moving, the classifier identifies a point of maximal speed and splits the location sequence at that point.

If the window is classified as not moving, the sliding window shifts one location reading towards the future, and the process repeats.

3.1.4 Segmentation and Centroid Computation

After the sliding window has covered all the locations of a user, the segmentation component 208 divides the whole location sequence into one or more segments. Each segment is called a location cluster. The segmentation component then calculates the centroid of a location cluster by combining the locations in this cluster.

$$\text{latitude}^* = \frac{1}{N}\sum_{i=1}^{N} w_i \text{latitude}_i$$

$$\text{longitude}^* = \frac{1}{N}\sum_{i=1}^{N} w_i \text{longitude}_i$$

where $w_i$ is the weight for the $i^{th}$ location. The weighted value depends on the source of the location. As an example, GPS locations have higher weights than other locations. In another implementation, an internet search engine may be weighted higher than a restaurant recommendation service.

3.1.5 Merging

It is possible an actual cluster is broken into several clusters, because of noisy location data. An extra step is taken or a process implemented to merge consecutive clusters if their centroids are close. The merging component 210 handles such merging. One condition, implemented by the merging component, for two neighboring clusters to merge is when the distance is below a threshold, and the start time of the later cluster is no later than a few minutes after the end of the earlier cluster.

3.1.6 Stop Classifier

The stop classifier component 212 examines the duration of each cluster, and decides if the cluster represents a user staying at a place. If the duration does not fall into a predefined range, the cluster is filtered out and not considered for next stages. An example predefined range would be any time between two minutes and three hours.

3.2 Candidate Search

After clusters are generated under the clustering module 202, the system sends search requests or queries to a place database to retrieve places close to each cluster's centroid.

The place database contains information for all the places that have been collected by the analytics server. The information includes name, address, location, category, business hours, reviews, and parcel geometries. The place database is geospatially indexed so that a search by location can be quickly performed. All places that are within a radius from the cluster centroid are returned as candidate places.

Place data is generated from multiple sources, including by not limited to, geographic information databases, government databases, review Web sites, social networks, and online maps. Places from multiple sources may be matched and merged, creating a richer representation of each physical place. By combining information from multiple sources, one can minimize noise and improve data quality. For example, averaging locations of the same place from all sources, and giving higher weights to more reliable sources can improve the estimation of the actual location of the place. The actual location of each place is provided by a place location ground truth (described later).

3.3 Feature Generation

For each cluster, the analytics server of the inference pipeline takes all of the place candidates found from the place database and ranks them by the probability that a typical user, or this particular user, would visit. Before that, features are extracted from each candidate.

Three types of features can be extracted from each place candidate:
1. Cluster features are only dependent on the cluster itself, not any place candidates. A cluster feature has the same value for all the candidates of a cluster.
2. Place features are place specific features. Each candidate may have different place features depending on their attributes such as locations and categories.

3. User features which depend on the user's profile such as demographic attributes. Similar to cluster features, user features are the same for all the candidates of a cluster.

3.3.1 Cluster Features

Cluster features describe properties of the cluster and can include:
- Duration of the cluster
- Noisiness of location readings in the cluster, measured as the average accuracy
- Number of location readings in the cluster
- Radius of the cluster
- Probability of visiting different categories of places given the timestamp for the cluster or "cluster time"
- Density of places near the cluster centroid
- Zoning information of the cluster centroid
- Season, weather, or temperature associated with the cluster time

3.3.2 Place Features

Place features describe properties of a place candidate. Place features include
- Distance to cluster centroid
- Number of sources: The place database collects place information from a number of reverse geo-coding sources. This feature counts how many data sources provides the place
- Low quality place location: Some data sources have low accuracy place locations. This feature examines if a place candidate only comes from individual or lower accuracy data sources.
- Popularity: Popularity of a place can be calculated from number of times users check in to a place, number of people who connected to a place on social networks, number of comments or reviews, Wi-Fi/Bluetooth signal visibility to users' mobile electronic device, noise level, transaction volumes, sales numbers, and user visits captured by other sensors.
- Category: If the category taxonomy is a multi-level hierarchy, more than one features can be used
- Single user place: This feature is defined as whether a place has small number of users who ever checked in or otherwise visited this location.
- Review count: For places that come from data sources with reviews, this feature is the total number of reviews
- Time-category match: This feature measures the probability of a user visiting a place of a particular category, given the day or time of day. For example, at 7 AM, a user is more likely to visit a coffee shop than a night club
- Business hours: Probability the place is open at the time of the visit.
- Parcel distance: The distance between the centroid of the parcel and the centroid of the cluster
- Cluster in place parcel: This feature is true when the centroid of the cluster falls into the parcel of the place

3.3.3 User Features

User features are generated from user profile, including demographics, mobile device information, user location history and other information that helps predict where a user is visiting. Past place visits are also useful in predicting future visits. For example, if high-confidence inferences have been made in the past that a user visited a certain neighborhood grocery store every week, the user is more likely to go to this place if he/she hasn't been there for seven days.
- User demographics, including age, gender, income level, ethnicity, education, marital status, and number of children
- Distance to home location
- Distance to work location
- Commute patterns
- Device features including manufacturer, model, service provider, and sensor availability.
- Frequently visited places in the past.

3.4 Inference Engine

All the features are combined as a composite feature vector and normalized to the range of zero to one. For each cluster, the inference engine examines the feature vectors of each candidate place and ranks them by the probability of being the actual place.

3.4A Ranking Candidates

The inference engine may use a mapping from a feature vector F to a ranking score s, such as via a linear model:

$$s = W^T F - b$$

$$= \sum_{i=1}^{M} W_i F_i - b$$

where W is the weight vector, b is the bias value, and M is the total number of candidates. The higher this ranking score, the more likely the candidate is the actually place. The weight vector is determined by the training process.

3.4.2 Probability Estimation

The inference engine then turns the score into a probability $$\phi = e^s$$

$$P(Place_j) = \frac{\phi_j}{\sum_{k=1}^{n} \phi_k}$$

With this probability, one can either take the candidate with the highest probability as the inference output, or use a list of top candidates, along with their probabilities, as the result.

3.5 Ground Truth Generation

In order to verify inference models, the system collects ground truth data. This data is considered to be accurate observations that link a user with a place at an instance of time. This data is used to train and validate the inference models downstream. Some sources of reference data include, but are not limited to, the following:

3.5.1 Place Location

Ground truth for place locations is collected by having human labelers associate places with locations on mapping tools. Each location is then converted to a latitude-longitude coordinate and stored in a database. The labelers may be tasked with identifying the place in question on an aerial map and writing down the coordinates of the center of the building and the geometry of the building. If there is more than one place sharing the same building, the best estimation of the correct corner is taken.

3.5.2 Place Confirmation

This is a place where a user checks in or confirms as the actual place associated with his or her location. If a place is not listed, the user has the ability to manually add the name of the place. A place confirmation includes data sources such as a voluntary check-in, or from sensor measurements of temperature, sound, light, proximity sensors, or near field communication (NFC) chipsets, etc.

Place confirmations are determined with a separate tool that collects ground truth data. An example of such tool is a mobile application that suggests a list of places to check-in to, given the user's location. Every time a user checks-in to a place, this is logged as a check-in observation event. When the check-in is registered, the check-in observation event is associated with a latitude and longitude and timestamp. This source of data serves as a direct validation of inference model and is used to train the model.

3.5.3 Offline Check-in

Users can check in to a place via third party location-based services. When a user registers a check-in, the analytics server requests check-in information logged by the user within that service. These check-ins are transmitted as offline check-ins. This source of data serves as reference data for the inference pipeline. By combining mobile device data and user check-in created using third-party software, the analytics server can map a user's device data to places.

3.5.4 Place Queries

A check-in service includes social networking websites that allow users to "check in" to a physical place and share their location with other members. Examples of check-in services include Facebook, Foursquare, Google Latitude, and Gowalla. Check-in services provide a list of nearby places and allow an opportunity for the user to confirm a place s/he has visited. The place data can then be stored with the check-in service provider in order to support personal analytics, sharing on social networks, earning incentives, public and private recognition, general measurement, broadcasting, and history. Every time a user queries check-in services for nearby places, the data is packaged into an observation that is sent to the analytics servers. A place query contains a time stamp, user location, and places received from each check-in service. This data helps to preserve and recover original user check-in experience for verification purpose.

3.5.5 Place Survey Answers

This is obtained from sources that include but is not limited to responses to survey questions relating to places visited by a user. Survey questions are generated by the inference pipeline and serve as a form of feedback mechanism. In one implementation, survey questions are generated automatically. After the inference pipeline predicts a user's visits within a certain time window, an algorithm evaluates the uncertainty of each inferred visit and picks highly-uncertain instances to generate survey questions. Questions are generated using various rules to improve the accuracy of an inference, and eliminate results that are highly ambiguous or have a low confidence. In turn, uncertain inferences are used to generate survey questions because the inferences tend to have low accuracies and thus, any validation of such inferences helps improve the inference engine. An example presentation of survey questions is "Were you at one of the following places around 4 PM yesterday?"
  A. Starbucks Coffee
  B. McDonald's
  C. Wal-Mart
  D. None of the above Answers to Survey Questions are used as training data to fine-tune the inference model, and improve the chance that the correct place is ranked as top candidate. User data from mobile devices and survey question answers are paired up to create training samples, and input to machine learning algorithm to adjust the inference model.

To detect fraud and estimate data quality, random places are included in survey questions. In one implementation, a place that is not in the vicinity of the user is added to the choices. If this place is picked, the survey question is marked as invalid. Statistics associated with fraudulent answers are used to determine the reliability of survey answers. Also, the order of answers is randomized to remove position bias.

3.5.6 Activity Journal

By combining a digital journal with a mobile device, a user can be associated with a verified location in order to produce validated place data. The device registers observations that include location data, and the digital journal enables an individual to log actual place and time data. The digital journal which includes place and time data is combined with device observation using time stamp as the "join point." A join point can use time to correlate digital log data with device observation data. This joining of two sources of data generates reference data for the inference pipeline. For example, when a user enter information into a digital log that he was at a coffee shop at 9 AM, and when there is observation data collected at 9 AM, a join point is created for 9 AM that associates the device observations with a location of the user (i.e., coffee shop).

Journals are tabular data in any form, such as a spreadsheet or digitized paper form. Processing journals can either be a manual or automatic process. Journals can be turned into any format, such as text files or a database, as long as it can be processed by the inference pipeline.

Reference data is considered highly accurate and is designed to generate pinpoint accuracy in terms of location, place, time, and activity.

TABLE 3

| Place Name | Mall/Area | Date | Walk-In Time | Leave Time | Entry/Exit | Path to Place | Actions at Place | Notes/Issues |
|---|---|---|---|---|---|---|---|---|
| General Store | Main St | Nov. 8, 2011 | 11:52am | 12:01pm | South Door | Took sidewalk from parking lot | Stood near entrance | NA |

Table 3 provides example fields in the digital log completed by a journal-taker. The journal-taker completes each of the columns confirming the place name of a visit records any optional notes or issues. The time stamp can be automatically filled-in or manually entered. The values in these fields assign information to device observation data. The level of precision and accuracy is considered high based on the details collected by the digital logs. This data is considered high value across reference data sources.

3.5.7 Third-party Reference Data

Data can be bulk imported into the system from third-party feeds that include questionnaires, travel logs, credit card purchase logs, mobile wallet transactions, point-of-sale (POS) transactions, bar code scanning, security card or electronic access data (e.g., access to buildings, garages, etc. using security cards/PIN codes), etc. The inference pipeline infrastructure provides interfaces to bulk import data that can augment the database with reference data.

3.5.7.1 User-Generated Contents

Validation data can be generated by associating data collected on mobile devices with user-generated contents on social networks, review sites and other types of information sharing platforms. For example, a social network post about an event directly matches a place. Similarly, user's contacts on a social network may also be used as a source of ground truth to validate location data.

3.5.7.2 Purchase Records

Purchase information identifies a place where a purchase occurred, and a time when the purchase occurred. These values combined with location data act as a form of validation and can be treated as ground truth for the inference pipeline.

Without the location data, store activity can still be used in the inference pipeline to identify that the user has visited a place, and the frequency of purchases can determine frequency of visits. This store activity acts as a behavioral roadmap of past activity as it can be indicative of future behavior in the form of places visited.

3.5.7.3 Network Data

Network data includes a network of devices that register location data at various levels of precision. Sources of network data include mobile carriers, network service providers, device service providers and the data and metadata may be collected as a byproduct of core services.

As an example a mobile carrier provides cell phone service to millions of customers via their cellular network. This network is a byproduct of providing core cell service registers location data because the mobile device is connected to an access point. Aggregating this data across all customers creates a density map of carrier activity associated with location, which the data collection system defines as Network Data. This network data can act as a proxy of baseline location activity for millions of customers. In addition, the network data may help to identify popular sites or more trafficked areas so that more accurate predictions for a user's location can be made.

The network data acting as baseline location activity enables the data collection system to identify location biases and build models to normalize against those biases. As more sources of network data are incorporated, the models become more robust and diversified, as a single source may not accurately represent a population in a given geographic area.

Network information related to WiFi base stations, such as signal strengths, frequently-used WiFi networks, may be correlated with place confirmation data in order to build a history of check-in activity or empirical data. In this implementation, WiFi network features can be used as markers to identify a place. WiFi network features include aspects such as a network name (SSID), signal strength, MAC address, IP address, or security settings. Features generated from a device that is associated with a WiFi network include names of available WiFi networks, WiFi networks a device is connected to, and names of WiFi networks that are visible to the device—all of which provide additional information about a person's location in relation to a place. These features act as markers in the inference model to determine a place.

As an example if a device is constantly connected to a certain WiFi network name over the span of a few days from 7 pm to 7 am, this WiFi network may become a marker that signifies the home of the device owner. This concept of a continuous, recurring, and/or persistent WiFi network connection applies outside of home, including work and school.

As another example, networks named after networking devices, such as "linksys" or "NETGEAR," are more likely to be home networks than business networks. Also, a connection to a WiFi network is a strong indication that a person is located at or near a place that is frequently or commonly visited. This same logic is applied to identify businesses, where the network name might identify an actual business name providing the service (e.g., McDonald's WiFi, Starbucks, Barnes and Noble Customer WiFi, Best Western Inn Wireless).

4. Improving Inference Model with Machine Learning

As noted above, the inference engine may be validated with ground truth data that maps user locations to places.

4.1 Training Data

Training data contains a list of location records or labels that can be generated by users who carry the mobile electronic device with them in normal daily life. Each label consists of a timestamp, a reference to a place in the database, and the user ID. The users' mobile electronic devices are also tracking their locations. By looking up the user ID of each label, corresponding location readings can be retrieved. Using the retrieved location readings close to the label timestamp, one can go through the inference pipeline, starting from clustering, to predict the location of a user. The machine learning process uses the predicted place and actual place to tune the model.

Training data can come from either direct validation data, such as user check-in and survey questions, or indirect validation data, such as credit card transaction history. Indirect validation data can be used in the same way as direct validation data, to improve ranking of place candidates, and estimate the accuracy of an inference. Data collected on a user's mobile devices is fed to the model, and then the output of the inference model(s) is compared against the input data. Any disagreement between model output and desired result is sent back to the model to adjust parameters.

Each training sample consists of a feature vector and a label for every candidate place of a cluster. For a cluster with M candidate places, the label is represented as a probability $$P_y(x_j), j=1, \ldots, M$$

where $x_j$ is the $j^{th}$ candidate. If $x_{j^*}$ is the correct place $$P_y(x_j) = \begin{cases} 1, & j = j^* \\ 0, & j \neq j^* \end{cases}$$

4.2 Loss Function

The loss function is defined as the cross entropy. If the output of the model is represented as $$P_{z(f_W)}(x_j)$$

where f is the model, and W is the model parameter (for example weight vector). The loss function is $$L(y, z(f_W)) = -\sum_{j=1}^{M} P_y(x_j) \log(P_{z(f_W)}(x_j))$$
$$= -\log(P_{z(f_W)}(x_{j^*}))$$

4.3 Optimization

Gradient descent is used to optimize the model.

The gradient of the loss function is $$\Delta W = \frac{\partial L}{\partial W}$$
$$= \frac{\partial L(y, z(f_W))}{\partial W}$$

-continued $$= -\frac{\partial \log(P_{z(f_W)}(x_{j^*}))}{\partial W}$$

$$= \frac{\partial f_W(x_{j^*})}{\partial W} + \frac{\sum_{k=1}^{M} \exp\left(f_W(x_k)\frac{\partial f_W(x_k)}{\partial W}\right)}{\sum_{k=1}^{M} \exp(f_W(x_k))}$$

Since $\phi_k = \exp(s_k)$ and $s_k = f_W(x_k)$ $$\Delta W = -\frac{\partial s_{j^*}}{\partial W} + \frac{1}{\sum_{k=1}^{M} \phi_k} \sum_{k=1}^{M} \left(\phi_k \frac{\partial s_k}{\partial W}\right)$$

More specifically $$\Delta W_l = -F_{j^*,l} + \frac{1}{\sum_{k=1}^{N} \phi_k} \sum_{k=1}^{M} (\phi_k F_{k,l})$$

where $F_{k,l}^{(i)}$ is feature l of place candidate k in instance i.

The weight vector is update with this gradient $$W_l^{t+1} = W_l^t + \eta \Delta W_l^t$$

where $\eta$ is the learning. Learning stops when the results converge.

4.4 Accuracy Estimation

Some clusters are harder for the inference engine to predict than other clusters because of a number of factors, such as location accuracy, the number of candidate places close to the cluster, and availability of certain place attributes. A classifier is trained to estimate of the accuracy of each inference result. This estimated accuracy is used when aggregating inference results. For example, one can apply different weights based on the estimated probability of each inference being correct.

The accuracy estimation classifier takes several features as input including the average precision of locations in the cluster, the number of place candidates nearby, whether the location is inside an indoor mall, and whether the location is close to high rise buildings or in a more remote area.

This classifier is trained against validation data. This classifier does not impact the results of the inference engine, but it assigns a confidence value to each inference instance. This value is used to weight the impact of each inference when aggregating results. Inferences with lower confidence values are weighted lower than those with higher confidence values so that the overall result is more accurate.

5. Inference with Session Users

As discussed earlier, there are two modes of data acquisition or location input: continuously-tracked and session-based. What has been described previously includes a continuously-tracked mode of data acquisition. Session-based data acquisition mode is different in at least three aspects.

1. User locations for session users are segmented, whereas user locations for continuously-tracked users are non-stop. Location tracking is controlled by third-party applications or devices which integrate e.g., analytics agent. User locations are only available when a tracking session is turned on. The result is that the analytics server only receives location data during the sessions, which are typically short.

2. User location data is collected at a higher frequency because battery life is less of a concern when tracking is limited to short periods of time, locations are logged with higher frequency, typically once per second. The model will have a better estimation of user movement.

3. All sensors are turned on when tracking starts, including accelerometer, orientation, and gyroscope when available.

The difference between session-based location input and continuously tracked location input is addressed by modifying the inference pipeline in the following ways.

5.1 Movement Detection

When user speed is higher than a threshold, the system may skip the session and not run the inference engine. Speed is computed by dividing the diameter of the location bounding box by the length of the session.

5.2 Skip Clustering

When the user is detected to be stationary, the system may skip clustering. The entire session is considered as a cluster. The centroid of the cluster is computed the same way as a cluster in continuous tracking mode.

5.3 Additional Features

Because session users tend to have denser location readings and sensor readings, several features are added to the inference model to take advantage of additional data:

Application type data identifies the kind of application/device that is tracking the user Orientation data of the mobile electronic device Base frequency of the mobile electronic device's movement. A base frequency is computed from a Fourier transform of the accelerometer readings, and can be generated from historical data, such as using samples gathered over a day, week, month, or other timeframe. The base frequency can measure how fast a body oscillates. For example, a jogger's base frequency can be 3 Hz, while a walker's base frequency can be 1.5 Hz.

6. Aggregation of Inference Results

After collecting information from a user's mobile device for a period of time, and running the inference engine on the data, the results can be aggregated in different ways to serve different purposes.

6.1 Personal Location Profile

By aggregating a single user's place visit data, one can generate a user location profile with the user's consent which presents useful information about the user's behavior and visit patterns. Such information may include statistics about the user's daily commute, frequently visited places, vehicle's fuel economy, and other personal location analytics data. From this data, one can propose alternative routes, offer incentives to nearby businesses, and suggest similar places frequented by the user in the same area.

Figure 7:
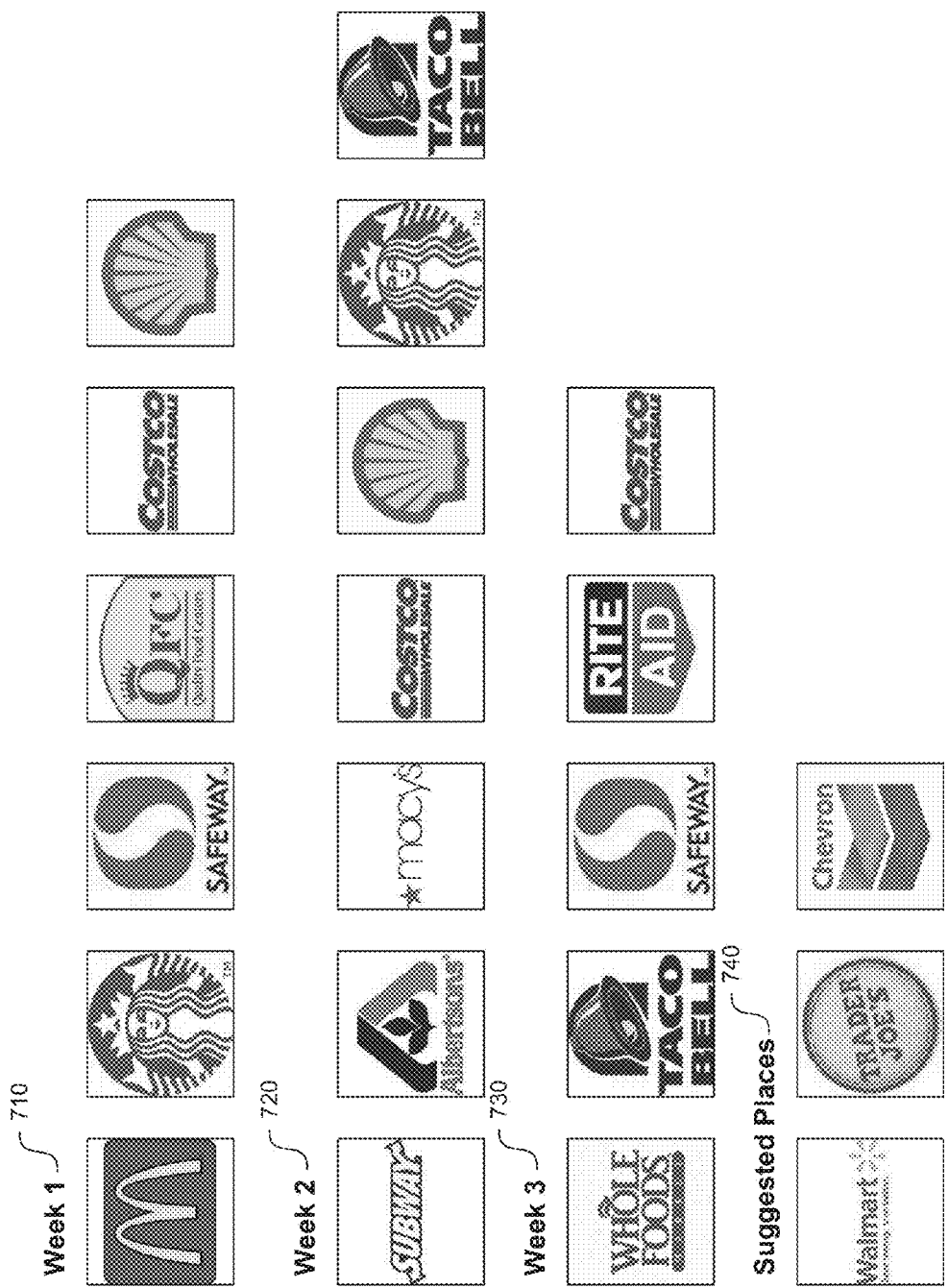
FIG. 7 depicts an example presentation of a personal location profile.

FIG. 7 illustrates an example presentation of a personal location profile, which shows places visited on a weekly basis, and suggests related places. While not shown in FIG. 7, timing information or timestamps are associated with inference results to infer activities such as lunch, activities after work hours, commuting, etc. As an example, week one 710 shows a visit to McDonald's and Starbucks during lunch for a certain amount of time (e.g., an hour and a half), spending an hour each at Safeway, QFC, and Costco for groceries after work, and finally refilling on gas at a Shell before returning home. Week 2's 720 visits to Subway, Albertsons, Macy's, Costco, Shell, Starbucks, and Taco Bell and Week 3's 730 visits to Whole Foods Market, Taco Bell, Safeway, Rite Aid and Costco can also reveal similar information such as visit duration, time of visit, venue address, proximity, etc. As a result of the user's personal location profile, the system can arrive at some suggested places 740 including Wal-Mart, Trader Joe's, and Chevron.

6.2 User Location Analytics

By aggregating data of places visited across multiple users, one can produce user location analytics for third-party mobile application developers. Such analytics report may display, among others, how often users consume a mobile application at home, at work and during commute, geographical distribution of user base, user activities before, during, and after consuming the application.

7. Conclusion

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A system for using location data to infer a place name of a user, comprising:
    at least one database configured to store place data and a sequence of location readings, wherein the place data includes place information and corresponding geolocation data, wherein the sequence of location readings includes latitude and longitude coordinate data and an associated time;

at least one server coupled to the at least one database, wherein the server is configured to:
  identify a list of location clusters, wherein each cluster includes a number of location reads that are chronologically continuous and geographically close to each other;
  compute a centroid or sub-centroids of each of the list of location clusters;
  query the place database to identify candidate places that are within a predetermined radius of the centroid of each location cluster;
  extract a feature from each of the candidate places, wherein the feature includes a place category, popularity, or hours of operation; and
  calculate a probability that the user is located at each of the candidate places, wherein the probability is based on features of the candidate places.

2. The system of claim 1, wherein the at least one database is further configured to store reference data, wherein the reference data links the user or the user's mobile device to a candidate place at an instance of time, and wherein the reference data includes at least one of: a user check-in at a certain place, a place category, a popularity of a place, or hours of operation.

3. The system of claim 1, wherein the at least one database is further configured to store sensor data, and wherein the sensor data includes at least two of: acceleration, magnetic orientation, proximity, light intensity, battery status, gyroscope, or temperature.

4. The system of claim 1, wherein the location readings also include altitude, bearing, and speed of a mobile device associated with the user.

5. The system of claim 1, wherein the at least one server is further configured to rank order a predetermined number of the candidate places for the user to validate as a confirmed location.

6. The system of claim 2, wherein the reference data is derived from at least one of: place check-in, internet search activity, social networking site activity, geo-tagged image, email, phone call, calendar appointment or network data.

7. A method for using location data to obtain a name of a place associated with the location data, comprising:
  receiving a sequence of location readings from a mobile device associated with a user,
    wherein the sequence of location readings includes latitude and longitude coordinate data and an associated time;
  filtering the location readings to produce filtered location data;
  identifying a location from the filtered location data;
  querying a place database to identify multiple candidate places that are within a predetermined radius of a centroid computed from the identified location; and
  calculating a probability that the user is located at each of the multiple candidate places.

8. The method of claim 7, wherein the filtering classifies a sliding window of N contiguous location readings over the sequence of location readings as moving or not moving, wherein N is an integer number of location readings.

9. The method of claim 8, further comprising segmenting the sequence of location readings into two or more location clusters, and identifying a centroid of each of the two or more location clusters.

10. The method of claim 7, further comprising rank ordering a predetermined number of the multiple candidate places for the user to validate as a confirmed location.

11. The method of 7, further comprising extracting a feature from each of the multiple candidate places, wherein the feature includes a place category, popularity, or hours of operation.

12. The method of claim 11, wherein the extracted feature of a candidate place is used in calculating the probability that the user is located at the candidate place.

13. A system for inferring a location of a user using location readings and sensor data from a mobile device wirelessly coupled to a network, the system comprising:
  a memory;
  a processor configured to execute instructions stored in the memory to:
    receive multiple location readings,
      wherein each location reading includes latitude and longitude coordinate data, and
      wherein each location reading has an associated time and an estimated accuracy;
    filter the location readings to remove location readings that are noisy or have estimated accuracy lower than a threshold;
    determine that the mobile device is stationary based on the filtered location readings;
    identify a time and location of a stop by temporally clustering the filtered location readings into location clusters; and,
    predict for each location cluster possible places associated with the identified stop at the identified time.

14. The system of claim 13, further configured to:
merge neighboring location clusters when a centroid of each of the neighboring location clusters is below a centroid threshold.

15. The system of claim 13, further configured to:
query a place database to retrieve the possible places that are within a radius from a centroid of each of the location clusters;
  wherein the place database stores addresses, locations and attributes corresponding to places.

16. The system of claim 15, further configured to:
extract an attribute of each of the possible places, wherein the attribute includes at least one of a place category or hours of operation.

17. The system of claim 16, further configured to:
calculate a probability that the user is located at each of the possible places, wherein the probability factors in a distance between reference data and each of the possible places and the extracted attribute.

18. The system of claim 13, further configured to compute a centroid of each of the location clusters as a weighted combination of location readings associated with the location cluster, wherein a weight of a location reading depends on the source of the location reading.

19. The system of claim 13, further configured to
extract at least two of cluster features from each location cluster, place features from each of the possible places or user features associated with the user;
determine a composite feature vector by combing the extracted features;
determine a ranking score for each of the possible places using the composite feature vector; and
calculate a probability that the user is located at each of the possible places based at least in part on the ranking score.

20. The system of claim 2, wherein calculating the probability that the user is located at each of the candidate places is based on hours of operation for the candidate places or a distance between the reference data and each of the candidate places.

21. The system of claim 17, wherein the reference data links the user to a proposed place at an instance of time, and wherein the reference data is derived from at least one of: place check-in, internet search activity, social networking site activity, geo-tagged image, email, phone call, calendar appointment or network activity.

22. A non-transitory computer-readable storage medium storing instructions for using location data to obtain a name of a place associated with the location data, comprising:

instructions for receiving a sequence of location readings from a mobile device associated with a user, wherein the sequence of location readings includes latitude and longitude coordinate data and an associated time;

instructions for filtering the location readings to produce filtered location data;

instructions for identifying a location from the filtered location data;

instructions for querying a place database to identify multiple candidate places that are within a predetermined radius of a centroid computed from the identified location; and instructions for calculating a probability that the user is located at each of the multiple candidate places.

23. The medium of claim 22, wherein the instructions for filtering further comprises:

instructions for classifying a sliding window of N contiguous location readings over the sequence of location readings as moving or not moving, wherein N is an integer number of location readings; and instructions for segmenting the sequence of location readings into two or more location dusters, and identifying a centroid of each of the two or more location dusters.

24. The medium of 22, further comprising instructions for extracting a feature from each of the multiple candidate places, wherein the feature includes a place category, popularity, or hours of operation, wherein the extracted feature of a candidate place is used in calculating the probability that the user is located at the candidate place.

* * * * *